United States Patent
Canales Miranda

(10) Patent No.: US 8,097,132 B2
(45) Date of Patent: Jan. 17, 2012

(54) PROCESS AND DEVICE TO OBTAIN METAL IN POWDER, SHEET OR CATHODE FROM ANY METAL CONTAINING MATERIAL

(75) Inventor: Luis Antonio Canales Miranda, Santiago (CL)

(73) Assignee: Luis Antonio Canales Miranda, Santiago (CL)

( * ) Notice: Subject to any disclaimer, the term of this patent is extended or adjusted under 35 U.S.C. 154(b) by 996 days.

(21) Appl. No.: 11/770,373

(22) Filed: Jun. 28, 2007

(65) Prior Publication Data

US 2008/0006538 A1 Jan. 10, 2008

(30) Foreign Application Priority Data

Jul. 4, 2006 (CL) .................................. 1744-2006

(51) Int. Cl.
*C25B 9/08* (2006.01)
*C25C 1/12* (2006.01)
(52) U.S. Cl. ............ 204/259; 204/224 R; 204/225; 204/232; 204/237; 204/238; 204/281; 205/574; 205/575; 205/576; 205/586
(58) Field of Classification Search ............... 204/281, 204/286.1, 287, 224 R, 225, 232, 237, 238, 204/259; 205/574, 575, 576, 586
See application file for complete search history.

(56) References Cited

U.S. PATENT DOCUMENTS

| | | | |
|---|---|---|---|
| 1,901,364 A | 3/1933 | Cummings | |
| 1,945,107 A | 1/1934 | Eustis | |
| 1,980,381 A | 11/1934 | Eustis | |
| 2,058,126 A | 10/1936 | Bosqui | |
| 2,321,367 A | 6/1943 | Diggin | |
| 3,772,003 A | 11/1973 | Gordy | |
| 3,853,724 A | 12/1974 | Wojcik | |
| 3,876,516 A * | 4/1975 | Pace et al. | 205/554 |
| 3,954,569 A | 5/1976 | Vanderveer | |
| 3,957,600 A | 5/1976 | Ives et al. | |
| 4,039,403 A * | 8/1977 | Astley et al. | 205/573 |
| 4,061,552 A | 12/1977 | Everett | |
| 4,075,069 A | 2/1978 | Shinohara | |
| 4,085,026 A | 4/1978 | Halford | |
| 4,268,363 A | 5/1981 | Coughlin | |
| 4,328,076 A | 5/1982 | Fisher | |
| 4,338,177 A | 7/1982 | Withers et al. | |
| 4,555,942 A | 12/1985 | Ludvigsson | |

(Continued)

FOREIGN PATENT DOCUMENTS

GB 315481 7/1929

(Continued)

OTHER PUBLICATIONS

Gana, R. et al., "The development and applications of the anode-support system in electrochemical processes," Hydrometallurgy: (Amsterdam), 1998, vol. 47, No. 2-3, p. 149-188.

(Continued)

*Primary Examiner* — Bruce Bell
(74) *Attorney, Agent, or Firm* — Stephen M. De Klerk

(57) ABSTRACT

A metal-containing material is introduced in the container with an anode inserted therein, the container is introduced in a tank filled with an electrolyte, with a cathode opposed to it, and direct current is passed through ((+) anode and (−) cathode) to recover the desired metal.

9 Claims, 1 Drawing Sheet

U.S. PATENT DOCUMENTS

| | | | |
|---|---|---|---|
| 4,612,093 A | 9/1986 | Shor | |
| 5,009,755 A | 4/1991 | Shor | |
| 5,439,562 A | 8/1995 | Snyder | |
| 5,616,246 A * | 4/1997 | Gagnon et al. | 204/240 |
| 5,650,053 A | 7/1997 | Gay et al. | |
| 5,690,806 A | 11/1997 | Sunderland | |
| 5,720,867 A | 2/1998 | Anastasijevic et al. | |
| 5,733,431 A | 3/1998 | Green | |
| 5,766,430 A * | 6/1998 | Mehler | 204/297.11 |
| 6,113,759 A * | 9/2000 | Uzoh | 205/157 |
| 6,156,169 A * | 12/2000 | Yang et al. | 204/280 |
| 6,190,530 B1 * | 2/2001 | Brodsky et al. | 205/147 |
| 6,299,748 B1 | 10/2001 | Kondo | |
| 6,322,609 B1 | 11/2001 | Kohut | |
| 6,391,170 B1 | 5/2002 | Day et al. | |
| 7,658,833 B2 | 2/2010 | Robinson et al. | |

FOREIGN PATENT DOCUMENTS

| | | |
|---|---|---|
| GB | 485089 | 5/1938 |
| GB | 676007 | 7/1952 |
| GB | 835614 | 5/1960 |
| GB | 1004380 | 9/1965 |
| GB | 1092254 | 11/1967 |
| GB | 1349672 | 4/1974 |
| GB | 1369000 | 10/1974 |
| GB | 1427267 | 3/1976 |
| GB | 1602664 | 11/1981 |
| JP | 50-39597 | 2/1993 |

OTHER PUBLICATIONS

Stelter, M, et al., "Process optimization in copper electrorefining," Advanced Engineering Materials, vol. 6, Issue 7, pp. 558-562, Jul. 2004.

Slater, S. A., et al., "Electrochemical separation of aluminum from uranium for research reactor spent nuclear fuel applications," Separation and Purification Technology, vol. 15, Issue 3, May 3, 1999, pp. 197-205.

* cited by examiner

PROCESS AND DEVICE TO OBTAIN METAL IN POWDER, SHEET OR CATHODE FROM ANY METAL CONTAINING MATERIAL

FIELD OF THE INVENTION

The present invention is related to the extractive mining industry and particularly to a procedure and a device to obtain copper powder, plates or cathodes from any copper-containing material by means of an electrolytic process.

BACKGROUND OF THE INVENTION

Presently, there is no method by which 99.9% purity copper can be recovered from ores by a single procedure. Different methods are used to recover and refine copper. For example, the most common method is the heap leaching method for copper oxides and subsequent electrowinning of copper cathodes, wherein the following basic steps are performed:
1. Grinding the ore under ¾" (1.905 cm)
2. Agglomerating the resulting material with common sea water mixed with sulfuric acid.
3. Storing the agglomerate in a heap and spraying the heap with the former liquid mixture for many months.
4. Storing the liquid obtained in an extraction tank thereby obtaining a copper-rich solution.
5. Desalting and demineralizing the solution.
6. Conducting the copper-rich solution or electrolyte to the electrowinning tank, wherein cathodes are obtained.

Likewise, there are patent documents that allow recovering metals from their mineral form present in the ores by means of electrolytic processes, for example, U.S. Pat. No. 3,772,003, entitled "Process for the electrolytic recovery of lead, silver and zinc from their ore", which discloses a method to extract zinc, silver and/or lead from their sulfated and mixed ores and ore concentrates. The method comprises electrolyzing a finely divided mixed ore in the presence of a catalyst in the anodic chamber or compartment of an electrolytic cell, said catalyst including a cupric halide ionic complex (CuX) in aqueous hydrogen halide, being chloride the preferred halide. The cupric halide ionic complex initiates a reaction under the influence of an applied electric current, thereby generating an oxidizing species that attacks and oxidizes the solids in the anodic chamber or compartment. The cupric halide ($CuX_2$), preferably cupric chloride, is further added to avoid hydrogen sulfide evolution, particularly when iron and zinc sulfides are present. An ion-selective permeable membrane is used to separate the anodic compartment, which contains the mixture of ores and reactants, from the cathodic compartment. This patent is not intended for copper extraction.

In the closest state of the art, it is possible to find U.S. Pat. No. 4,061,552, entitled "Electrolytic production of copper from ores and concentrates", equivalent to Spanish Patent EP 445,459, which describes a process to extract copper from a copper-containing ore or concentrate that comprises immersing the ore or concentrate into an electrolyte, intimately mixing the slurry to incorporate finely dispersed air or other oxygen-containing gas, and maintaining the mixture pH in the range from 1.5 to 7 throughout the process. Iron is dissolved in the process and it precipitates as ferric oxide, while copper is taken into solution. The process is carried out substantially at atmospheric pressure and at temperatures ranging from 50° C. to the electrolyte boiling point. The electrolyte is an acid one and contains chloride ions concentrated enough to maintain in solution or in saturation every copper ion present. Furthermore, the patent document claims this process to be performed in an electrochemical cell with a diaphragm, which has an anodic compartment and a cathodic compartment to collect the extracted metal. The main differences between the abovementioned patent document and the present invention are the following:

- The present invention is different because it does not require air injection.
- Furthermore, the present invention is also different in the temperature used, because the abovementioned patent requires it to be within the range from 50 to 105° C., preferably 85° C., and the process of the invention operates at room temperature or at the temperature naturally reached by the solution, avoiding heating or cooling requirements.
- The present invention also differs in mobility and used materials; the device of the present invention is portable and interchangeable, and is made of different materials, preferably titanium or stainless steel.
- Another advantage of the process of the present invention is that it exclusively recovers copper with a purity level of 99.9%, even when the carrier material may contain other contaminant metallic elements such as iron and silica. On the contrary, in the examples of the abovementioned patent the recovered copper appears mixed with a percentage of silver and iron as contaminant elements.

DETAILED DESCRIPTION OF THE PREFERRED EMBODIMENT(S)

Figure 1:
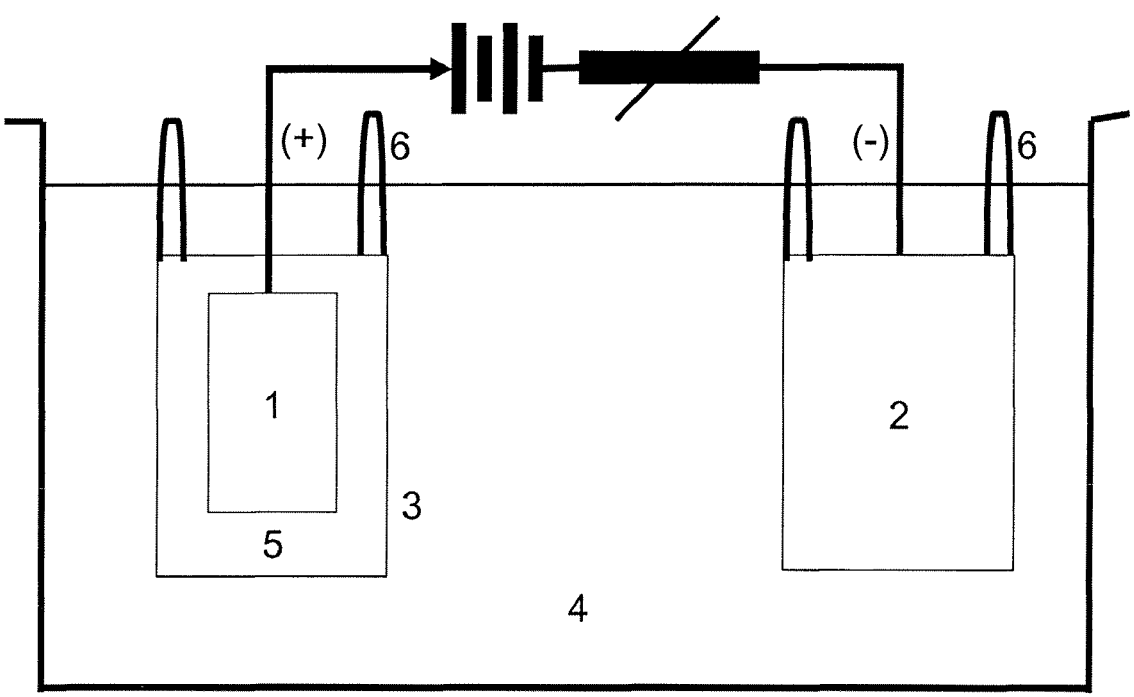
FIG. 1 shows an electrowinning tank wherein an anode 1, a cathode 2, the device of the present invention 3, an electrolytic solution 4, a copper-containing mineral or ore 5 and hooks 6 are present.

The present invention is related to the extractive mining industry and particularly to a procedure and a device to obtain copper powder, plates or cathodes from any copper-containing material by means of an electrolytic process. To this end a device has been designed that comprises a container covered with a brushed or porous polymer into which the copper-containing material is added; this device is introduced in an electrowinning tank filled with an electrolyte, said electrowinning tank also comprising a removable hooked cathode on which the recovered mineral will deposit.

The device of the present invention is a container that can be made of polymer, titanium, lead, copper, stainless steel or mixtures thereof, preferably titanium, covered with a brushed or porous polymer, preferably polyethylene, with a porosity no less than 600 mesh. Said container can have any geometry, e.g. squared, rectangular or parallelepipedic, preferably parallelepipedic with squared or rectangular faces, having a thickness greater than 1 mm, with perforations having an orifice density lower than 50% of its surface, said perforations or orifices having a preferred diameter of 1 cm. The device has hooks made of the same material, which must protrude from the top of the structure in such a way that they could serve for handling and electrical connection (see FIG. 1). The container has a capacity from 1 to 5,000 kilograms.

The brushed or porous polymer coating of the material serves to retain the metal-containing material or mineral ores, but allowing ions to pass through, like the principle used in tea bags. This also allows the applied current to recover almost all the metal at the same time in an accelerated way. The optimization of the system is put into evidence by the lack of oxygen bubble formation on the anode and hydrogen bubble formation on the cathode, by means of which electric losses are significantly reduced.

If the container is made only of brushed or porous polymer, an anode is required to be inserted into the container to carry out the process of the present invention.

In the procedure of the present invention, the material is not required to be previously concentrated. If the material is raw mineral, it must be previously grinded and washed as required if it contains an excess of powder.

If the material is copper scrap or waste, said material is introduced directly into the device without requiring a previous grinding and/or washing step.

The procedure to obtain copper powder, plates or cathodes from any copper-containing material comprises the following steps:
 a) Packing the copper-containing material, previously grinded and washed as required, into the device according to the present invention.
 b) Introducing said device into an electrowinning tank that must contain an electrolyte comprising from 0% to 1% NaCl, from 1% to 15% $H_2SO_4$ and from 98% to 84% $H_2O$. The electrolyte temperature may be in the range from 10° C. to 70° C., preferably room temperature.
 c) Carrying out the electrowinning by passing from 0.5 to 6 volts of direct current to recover the purified metal in the stainless steel cathode by electro-deposition.

To carry out electrowinning of copper powder, a voltage from 6 to 75 volts must be applied by using the same procedure and device.

With the procedure of the present invention, copper powder, plates or cathodes are obtained with 99.9% purity, and said procedure has the advantage of indefinitely using the same electrolyte with minimum acid and water loss.

APPLICATION EXAMPLE 100 kilograms of raw copper oxide mineral (ore) with 2% copper were grinded under 2 cm and were introduced in the device of the invention. The whole was introduced in an electrowinning tank with an electrolyte having 10% $H_2SO_4$, 0.1% NaCl and 89.9% $H_2O$ at room temperature.

The electrowinning process was performed by using a voltage of 1.6 volts at 40 amperes, and a 1×0.36 m stainless steel cathode with a thickness of 3 mm.

After one hour, an 80-gram copper plate with 99.9% copper purity was obtained.

The advantages of the present invention when compared to the previous art are related with the removal of steps 2 to 5 of the general heap leaching process (mentioned in the description of the state of the art) and the subsequent electrowinning process, by using the device and process of the present invention, thereby shortening the required time to hours and accelerating electro-deposition by at least two times. By using the abovementioned process, 1 gram of copper is obtained per 1 ampere-hour, thereby economizing in the amount of devices required for the same productive level. Furthermore, the electrolyte is reused since $H_2SO_4$ is regenerated at the cathode when the solution yields copper cations. This has the advantage of not requiring tailing reservoirs, which constitute an environmental contribution of the process. Other advantages were previously mentioned.

What is claimed is:

1. An electrowinning device comprising:
 an electrowinning tank for holding an electrolyte:
 a cathode in the electrowinning tank to be subjected to the electrolyte; and
 an anode system in the electrowinning tank, the anode system including a container to contain a copper-containing material to be subjected to an electrowinning process to obtain copper that deposits on the cathode, wherein the container is at least partially made of polymer having a porosity lower than 50% of its surface to allow ions to pass therethrough and the container is at least partially made of at least one of titanium lead, copper and stainless steel.

2. The device according to claim 1, wherein said container is made exclusively of a polymer and the anode structure includes an anode inserted in the container.

3. The device according to claim 1, wherein the polymer is a brushed or porous polymer.

4. The device according to claim 1, wherein the polymer has a porosity not lower than 600 mesh.

5. The device according to claim 1, wherein the polymer is polyethylene.

6. The device according to claim 1, wherein the container has a thickness of at least 1 mm.

7. Electrowinning process to obtain copper from a copper-containing material, wherein said process comprises the steps of:
 a) packing the copper-containing material into the device according to claims 1 to 6 wherein the material is a raw, previously grounded mineral,
 b) introducing the device from step (a) into an electrowinning tank filled with an electrolyte, wherein the electrolyte comprises from 0% to 1% NaCl, from 1% to 15% $H_2SO_4$ and from 98% to 84% $H_2O$ said electrolyte being used indefinitely with minimal acid and water loss;
 c) carrying out an electrowinning process to recover 99.9% purity copper powder, plates or cathodes,
 d) maintaining the electrolyte temperature in the range from 10° C. to 70° C.,
 e) applying a voltage between an anode and cathode in the electrolyte.

8. Process according to claim 7, wherein the mineral is washed if the powder content after grinding is higher than 5%.

9. Electrowinning process to obtain copper from a copper-containing material, wherein said process comprises the steps of:
 a) packing the copper-containing material into the device according to claims 1 to 6 wherein the material is copper scrap or waste, which is packed directly into the device without requiring a previous grinding and/or washing step.
 b) introducing the device from step (a) into an electrowinning tank filled with an electrolyte,
 c) carrying out an electrowinning process to recover 99.9% purity copper powder, plates or cathodes,
 d) maintaining the electrolyte temperature in the range from 10° C. to 70° C.,
 e) applying a voltage between an anode and cathode in the electrolyte.

* * * * *